April 24, 1956 D. N. COVERT ET AL 2,743,119
BEARING SEAL
Filed May 17, 1951

Inventors
DON N. COVERT
RAY L. DENNEY

By
J. Pierre Kolisch
Attorney

United States Patent Office 2,743,119
Patented Apr. 24, 1956

2,743,119

BEARING SEAL

Don N. Covert, Pleasant Valley, and Ray L. Denney, Poughkeepsie, N. Y., assignors to The Federal Bearings Co., Inc., Poughkeepsie, N. Y., a corporation of New York Application May 17, 1951, Serial No. 226,902

3 Claims. (Cl. 286—5)

This invention relates to bearings, and particularly to sealing elements for retaining a lubricant in an anti-friction bearing and keeping out foreign matter.

Such sealing elements are used as end closures for the lubricant-containing space between relatively rotatable inner and outer elements such as bearing rings or a bearing sleeve and a shaft element. The sealing element is usually in the form of an annular washer fixed in the outer bearing element and in running contact along its inner circle with the inner element. One problem is to provide for a close, lubricant sealing contact of the washer with the inner ring or the shaft element without requiring exact machining of the inner circle of the washer. Another problem is to provide such close sealing contact without introducing excessive frictional resistance against relative rotation between the seal and one of its seating elements and without involving the danger of causing binding on the latter element, particularly upon eccentric motion or radial deflection of either washer seating element, as may occur under load or for some other reason. Still another problem is to provide a sealing washer element which will not lose its effective lubricant sealing contact with the relatively rotatable element upon radial deflection of either element and to provide a washer, the inner circle of which will not wear to oval or egg shape and thus lose its effective embrace of its circular seating portion on the inner element.

The general object of the invention is to provide a novel sealing washer which will solve these problems, will wear better, have less friction with the rotating element, and maintain a more perfect and lasting sealing contact with the latter element under all conditions, than is possible with sealing washers of the prior art.

More specifically, an object of the invention is to provide a novel sealing washer which will have a greater area of sealing engagement with the inner element than washers of the prior art, such as flat washers of comparable thickness at the margin of the center circle. It has been determined in practice that one result of the greater area of sealing engagement is a substantial reduction in wear of the inside circle of the washer. Another result is increased effectiveness in preventing lubricant leakage.

Another object of the invention is to provide a novel sealing washer having a glossy face surface, a part of which will be in running contact with a bearing element or the like, so as to reduce the frictional resistance and allow closer sealing running contact.

Still another object of the invention is to provide a novel sealing washer which will not bind between the relatively rotatable inner and outer seating elements even though in close running embrace with one of said elements and even though there may be appreciable deflection, particularly under load, of either of said elements. A specific object is to provide a novel sealing washer, the inner circle of which will not be worn to a non-circular shape as a result of radial thrust on the washer resulting from deflection of either of the relatively rotating seating elements. It is recognized that wear of the inner circle of the washer to non-circular shape will result in its losing effective sealing embrace of the inner element and, hence, will allow the lubricant to leak out.

More specifically, the invention aims to provide a novel sealing washer which is especially useful in sealing the end of a journal bearing such as, for example, the journal bearing of the shaft of a pump, fan etc. According to the invention, the novel washer is made of nylon or equivalent plastic material, so as to have a substantially unyielding texture and a smooth, glossy face, be capable of body flexure, and be chemically inert to the lubricant and additives in the lubricant.

An important feature of the invention is that the washer is pre-formed with a central, symmetrically dished portion converging from a face of the washer towards its center hole and providing at its small end a circular lip defining the center hole. According to the invention, the lip will be made slightly smaller than the shaft while the rim of the washer will be of such diameter as to permit a press fit in a counterbore formed in the outer bearing sleeve. Upon insertion of the washer into position between the outer bearing sleeve and the shaft, the lip will flex into close circular embrace with the shaft and thus center the washer with respect to the shaft, and the bearing sleeve, after which the rim of the washer is held in the counterbore by means of a retention ring. By thus centering itself on the shaft, the washer will compensate for possible eccentricity between the outer seat and the shaft. Such eccentricity may result, for instance, from machining or grinding operations on the outer bearing element subsequent to the counterboring of the inside surface of the outer element to provide an outer, washer seating groove therein.

Further, by reason of the dishing of the central portion of the washer, it will flex in order to follow deflection of the shaft, the section of the dished portion resisting the deflection bending to less inclination with the shaft while the opposite section of the dished portion bends to a greater inclination relative to the shaft. Such flexure of the dished portion permits the washer to take the thrust of the shaft without causing the washer lip to lose its close circular running embrace of the shaft and without causing binding between the washer and the shaft. In contrast, a flat sealing washer will bind on the shaft and its inner circle will eventually wear to an egg or oval shape, with resulting loss of effective lubricant sealing contact with the shaft. This is because the radial component of the shaft deflection will act against a straight radial section of the flat washer. Such straight radial section will have high resistance to yielding in the direction of its length and will thus tend to produce binding between the washer and the shaft upon deflection of the shaft. Moreover, any yielding of the flat washer within its plane will result in the stretching of its center hole and in its eventual wear to an oval shape. On the other hand, the dished sealing washer made according to the present invention will flex in a direction transverse to its plane in order to accommodate shaft deflection without stretching or wear of the lip defining the center hole.

More specifically, an object of the invention is to provide a sealing washer which will have a bowed shape when in position between the outer bearing element and the shaft, such bowed shape preferably being provided by preforming the washer so that its inside surface is convex.

According to the invention, the inside surface of the lip will be continuous with the glossy face of the washer and will embrace the shaft. This will provide a smoother, less frictional contact with the shaft than would be the case for edge contact of the inner circle of the washer with the shaft. Such inner circle is usually made by a piercing or punching operation which does not produce a satisfactorily smooth edge.

According to the invention, the lip of the dished washer, by reason of its being slightly smaller than the shaft, will be flexed upon insertion of the shaft therethrough whereby an extended area of sealing contact with the shaft is maintained, with the advantages mentioned before.

Other objects of the invention will be made clear in the following parts of the specification and be apparent from the drawing, in which.

Figure 1:
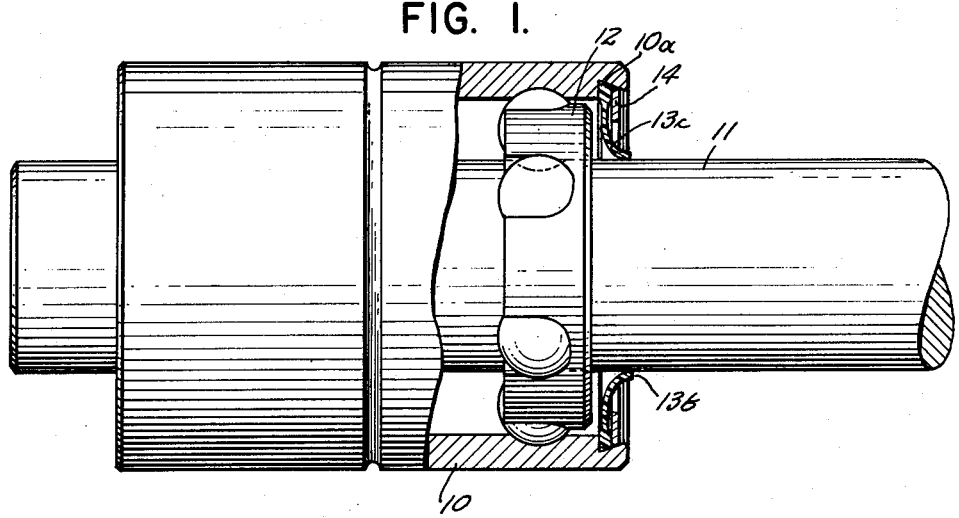
Fig. 1 is a partly sectioned view of a journal bearing incorporating the novel sealing washer at each end, with a retention ring for holding the washer against displacement.

Referring to Fig. 1, an anti-friction bearing is shown which may be used to journal the shaft of an automotive water pump, for example. The outer bearing element is designated 10 and the journaled shaft element is designated 11. Ball retaining cages 12 are provided between the elements 10 and 11, with the balls riding in concave raceways in the elements and maintaining the elements in relatively fixed axial positions. The outer bearing sleeve element 10 is counterbored at each end to provide an inner shoulder normal thereto and an enlarged inner peripheral surface 10a, tapering from said shoulder to each end face thereof; for the reception of a sealing washer 13 in each counterbore. The washer 13 is made of plastic material such as nylon, preferably by a molding process which provides for a normally smooth, glossy face surface. A washer made of this plastic material also has a substantially unyielding texture and is capable of partial body flexure transverse to its plane. The washer is pre-formed with a flat, relatively thick and rigid rim portion 13a and with a thinner, relatively flexible, central dished portion 13c terminating in or providing, at its center, a circular lip 13b. It is preferred to pre-form the dished portion 13c with a distinct bow curvature, with the inside face of the bow convexing from the glossy face (the left hand face, as viewed in the drawing) of the washer. It is to be noted that the inside surface of the lip 13b, which may be considered as the terminating portion of the bowed portion 13c, is continuous with the part of the glossy face surface of the washer. It is to be noted that the inside surface of the lip forms the periphery of the center hole in the washer.

The washer is formed with the inner circumference of the lip 13b slightly smaller than that of the shaft 11. Accordingly, the insertion of the shaft through the washer will result in a slight expansion of the lip transversely in an outward, partly axial direction so that it will assume a close bearing fit on the shaft, while the curvature of the bow will increase symmetrically with respect to its normal curvature. The rim of the washer is sprung into the tapered annular seat 10a and a retaining spring-ring 14 thereafter inserted in the seat to hold the washer in place against its adjacent shoulder and secure in the outer sleeve element 10. Since the inside surface of the lip is part of the glossy, smooth face surface of the washer, the friction between the lip and the shaft will be minimized. Further, the extended area of engagement between the lip and the shaft will result in reduced wear on the lip and will provide increased resistance to lubricant leakage.

It is to be noted that the dished portion 13c will take the thrust of shaft displacement which may occur under load and will flex to accommodate such shaft displacement or any eccentricity of rotation of the shaft. The section of the dished portion resisting the shaft displacement will bend to less inclination with the shaft and its curvature will increase while the diametrically opposite section will bend to greater inclination with respect to the shaft and its curvature will decrease. Since the thrust of the shaft displacement simply results in flexure or transverse bending of the dished wall of the washer, there is no tendency of the washer to bind on the shaft. Nor is there any tendency of the lip 13b to be distended or worn to non-circular shape by the shaft displacement.

It is seen that the invention provides a washer which centers itself on a shaft element to compensate for eccentricity between the shaft element and an outer washer seat in a bearing element, which provides an extended, partially cylindrical, running and lubricant sealing embrace of the shaft with consequent reduction in wear and increased effectiveness against lubricant leakage, and which will not bind on the shaft nor depart from effective sealing contact with the shaft upon deflection of the shaft. Further, by reason of the washer being made of a plastic material having a normally smooth glossy face and providing for a portion of this face; namely, that portion forming the inside surface of the lip 13b, to be the contacting surface with the shaft, the washer will have reduced frictional resistance against shaft rotation. The net effect is that a sealing washer is provided which will wear better and maintain effective sealing contact with a shaft element, without binding, even after long use under running conditions.

Figure 2:
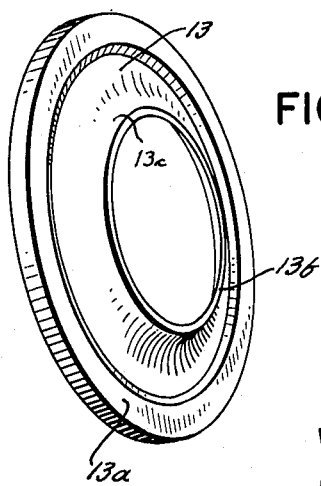
Fig. 2 is a perspective view of the novel washer.
Figure 3:
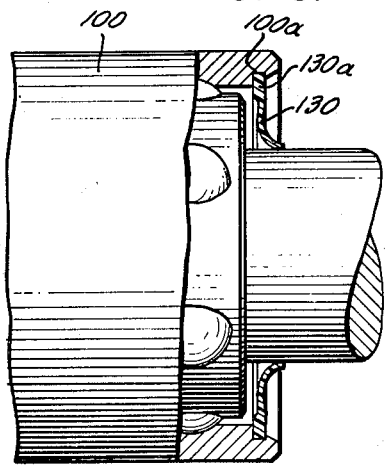
Fig. 3 is a view, partly in section, showing the improved sealing washer fixed in place without the use of a retention ring.

The sealing washer may be made with a thicker and more rigid rim portion which may be fixed into a seat in the outer bearing element without the need for a retainer ring. Fig. 3 indicates such washer, designated 130, having a thick rim 130a which is fixed into a circular groove 100a, of substantially square cross-section, formed in an outer element 100. In other respects, the washer 130 is similar to the washer 13 shown in Figs. 1 and 2.

It is to be understood that the sealing washer may serve as a seal between an outer bearing element and any inner rotating element, and the term shaft is to be given a broad connotation. It is to be further understood that while the inner element is here shown as rotatable, it may be stationary while the outer element and the sealing washer fixed to the outer element may rotate about the inner element.

Various changes and modifications in the details of the device disclosed herein by way of example may be made without departing from the spirit of the invention. It is intended, therefore, to be limited only as indicated by the scope of the following claims.

We claim:

1. A lubricant seal for an anti-friction bearing comprising two relatively rotatable spaced-apart inner and outer members, said outer member being provided adjacent an end face thereof with a counterbore defining a radial shoulder normal to the axis of rotation of said bearing and an inclined peripheral surface extending from said shoulder to said end face at an acute angle to said shoulder, a molded nylon washer disposed concentrically in said counterbore and having a thick outer peripheral portion terminating radially outwardly in a cylindrical surface concentric with said axis, the axially inner face of said thick outer peripheral portion lying flat against said shoulder and the axially outer peripheral edge of said thick outer peripheral portion having contact with said inclined peripheral surface of said counterbore, said washer also having an inner portion of reduced thickness having a central opening therein with its peripheral edge portion flared axially outwardly and slidably contacting said inner member, and a spring ring resiliently seated concentrically in said counterbore with its outer periphery in contact with said inclined peripheral surface of said counterbore, said spring ring being biased by said inclined surface against the axially outer side of said thick outer peripheral portion of said washer.

2. The invention of claim 1, in which the inner peripheral edge of said spring ring extends radially inwardly beyond said thick outer peripheral portion of said washer and is spaced axially outwardly of said reduced inner portion of said washer, and said flared edge portion of said washer terminates axially outwardly of said spring ring.

3. The invention of claim 1, said washer having a glossy surface on the side contacting said inner member.

References Cited in the file of this patent

UNITED STATES PATENTS

| | | |
|---|---|---|
| 2,252,554 | Carothers | Aug. 12, 1941 |
| 2,264,413 | Siegerist | Dec. 2, 1941 |
| 2,276,225 | Carter | Mar. 10, 1942 |
| 2,336,913 | Albrecht | Dec. 14, 1943 |
| 2,565,701 | Stewart | Aug. 28, 1951 |
| 2,584,227 | Potter | Feb. 5, 1952 |

FOREIGN PATENTS

| | | |
|---|---|---|
| 508,640 | Great Britain | of 1939 |

OTHER REFERENCES

"Molded and Machined Nylon," from "Product Engineering," December 1946, pp. 103–107 inclusive. (Copy in 288–SR) Patent Office.